United States Patent
Park

(10) Patent No.: US 7,932,698 B2
(45) Date of Patent: Apr. 26, 2011

(54) BATTERY CHARGING APPARATUS, CONTROL METHOD THEREOF, AND BATTERY CHARGING CONTROL APPARATUS FOR CHARGING A BATTERY WITHOUT AN EXTERNAL DEVICE

(75) Inventor: Jeong-gyu Park, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 755 days.

(21) Appl. No.: 11/941,457

(22) Filed: Nov. 16, 2007

(65) Prior Publication Data

US 2008/0218123 A1 Sep. 11, 2008

(30) Foreign Application Priority Data

Mar. 5, 2007 (KR) .................. 10-2007-0021418

(51) Int. Cl.
*H01M 10/46* (2006.01)
(52) U.S. Cl. ..................................... 320/132
(58) Field of Classification Search .................. 320/107, 320/132, 149
See application file for complete search history.

(56) References Cited

U.S. PATENT DOCUMENTS

| 5,666,039 | A | * | 9/1997 | Odaohara et al. | 320/152 |
| 6,127,810 | A | * | 10/2000 | Sato et al. | 320/148 |
| 7,432,685 | B2 | * | 10/2008 | Hayashi | 320/128 |

FOREIGN PATENT DOCUMENTS

| JP | 2005-278303 | 10/2005 |
| KR | 2004-45131 | 6/2004 |
| KR | 20-0377878 | 2/2005 |
| KR | 2006-116380 | 11/2006 |

OTHER PUBLICATIONS

"Smart Battery Data Accuracy Testing Guideline" SBS Implementers Forum, Dec. 1998, Revision 1.0.

* cited by examiner

*Primary Examiner* — Edward Tso
(74) *Attorney, Agent, or Firm* — Jefferson IP Law, LLP

(57) ABSTRACT

A battery charging apparatus which includes: an adapter which converts a voltage of an external electric power to a charging voltage of a voltage level corresponding to the battery, to charge the battery; and a controller which communicates with the battery to determine a charged state of the battery, and which controls the adapter to charge the battery based on the determination.

18 Claims, 5 Drawing Sheets

BATTERY CHARGING APPARATUS, CONTROL METHOD THEREOF, AND BATTERY CHARGING CONTROL APPARATUS FOR CHARGING A BATTERY WITHOUT AN EXTERNAL DEVICE

CROSS-REFERENCE TO RELATED APPLICATION

This application claims the benefit of Korean Application No. 2007-21418, filed Mar. 5, 2007 in the Korean Intellectual Property Office, the disclosure of which is incorporated herein by reference.

BACKGROUND OF THE INVENTION

1. Field of the Invention

Aspects of the present invention relate to a battery charging apparatus, and a control method thereof.

2. Description of the Related Art

Portable electronic apparatuses, for example, notebook computers, and Personal Digital Assistants (PDAs) are widely used. The portable electronic apparatuses use an electric adapter, or a battery, as a power system. In order for portable electronic apparatuses to use a battery as a power system, the battery should be charged, either while mounted in the portable electronic apparatuses, or while disposed in an external charger.

FIG. 1 is a block diagram illustrating a conventional battery charging apparatus. As illustrated in FIG. 1, the conventional battery charging apparatus includes an adapter 1 and an external charger 2 to charge a battery 3.

The adapter 1 converts an input alternating-current (AC) power into a direct-current (DC) power and provides the DC power to the external charger 2. The external charger 2 converts a voltage of the input DC current into to a voltage level necessary to charge the battery 3 and provides the converted voltage to the battery 3. The battery 3 can be mounted in a battery compartment, which is provided on one side of the external charger 2.

As illustrated in FIG. 1, the external charger 2 includes a voltage converter 4, which converts an input voltage into a charging voltage, which has a voltage necessary for charging the battery 3, and a controller 5, which communicates with the battery 3, and controls the voltage converter 4. The controller 5 communicates with the battery 3, to determine whether the battery 3 needs to be charged, and whether a voltage level of the battery 3 is at a suitable level. Also, the controller 5 controls the voltage converter 4 to convert an input voltage (VDC) supplied from the adapter 1 to a charging voltage necessary for charging the battery 3. Also, the controller 5 stops charging the battery 3 when the battery 3 is fully charged.

The conventional battery charging apparatus should have the external charger 2, which receives the input electric power from the adapter 1, and supplies the same to the battery 3, in order to charge the battery 3. This may cause the battery charging to be burdensome. Further, this may incur an additional expense in having an additional external charger 2, which must also be carried with the portable electronic apparatus.

SUMMARY OF THE INVENTION

Aspects of the present invention relate to a battery charging apparatus, a control method thereof, and a battery charging control apparatus, which can charge a battery without using an external battery charger, and without the battery being mounted in an external electronic charging apparatus.

Other aspects of the present invention relate to a battery charging apparatus, a control method thereof, and a battery charging control apparatus, which can charge a battery without an external battery charger. The lack of an external battery charger can reduce production costs and provide a market advantage.

The foregoing and/or other aspects of the present invention are achieved by providing a battery charging apparatus which charges a battery. The apparatus includes: an adapter to convert a voltage of an input electric power to an appropriate voltage level, to charge the battery; and a controller to communicate with the battery to determine a charged state of the battery, and to control the adapter based on the determined charged state.

According to aspects of the invention, the adapter includes a voltage converter to convert the voltage of the input electric power to charging voltage having a predetermined voltage level. The controller controls the voltage converter to convert the input electric power to a voltage level corresponding to the battery, based on a communication with the battery. According to aspects of the invention, the adapter is a Narrow VDC $2^{nd}$ (NVDC 2) adapter.

According to various aspects of the invention, the adapter includes a control pin, and the controller controls the voltage converter, to convert the input electric power to a charging voltage to charge the battery, through the control pin. According to aspects of the invention, the controller is included in a cable, which connects the battery and the adapter. According to an aspect of the invention, the controller is included in a connector, which connects the battery and the adapter.

Aspects of the present invention provide a method of controlling a battery charging apparatus, the method including: inputting an electric power to an adapter; communicating with the battery to determine a charged state of the battery; and controlling the adapter to convert the input electric power to a charging voltage having a voltage level suitable for charging the battery, based on the determined charged state of the battery.

Aspects of the present invention provide a battery charging control apparatus including: a communicator to communicate with a battery; and a controller to communicate with the battery through the communicator, to determine a charged state of the battery, and to control an external voltage converter to convert an input electric power to charging voltage having a voltage level suitable for charging the battery.

According to aspects of the invention, the battery charging control apparatus is a cable that connects the battery and the voltage converter. According to aspects of the invention, the battery charging control apparatus is a connector that connects the battery and the voltage converter.

Additional aspects and/or advantages of the invention will be set forth in part in the description which follows, and in part will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
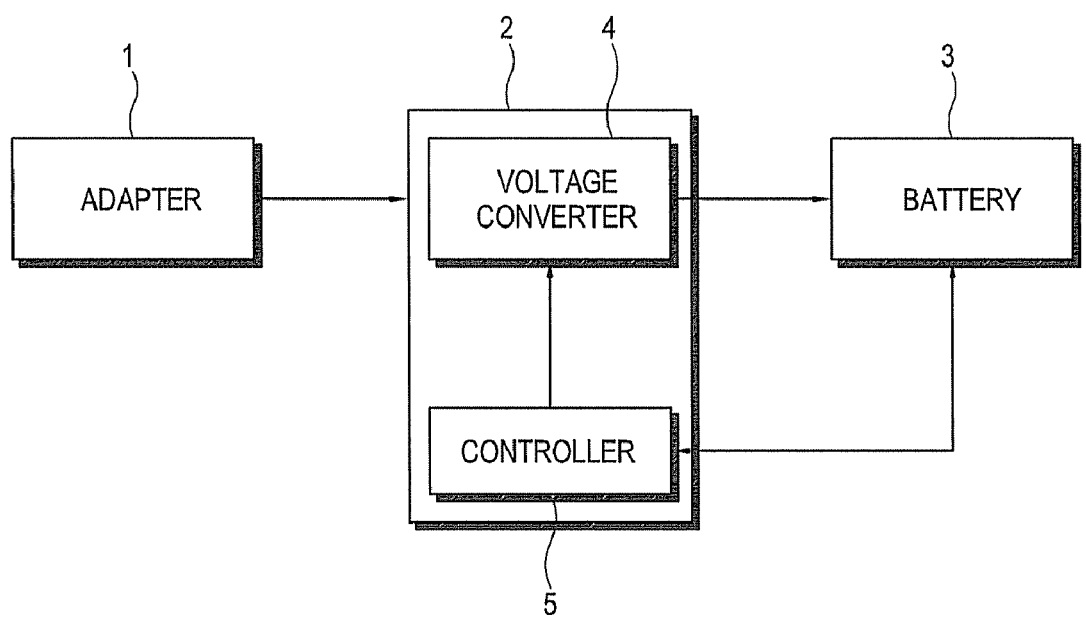
FIG. 1 is a block diagram showing a conventional battery charging apparatus.

Reference will now be made in detail to exemplary embodiments of the present invention, examples of which are illustrated in the accompanying drawings, wherein like reference numerals refer to like elements throughout. The exemplary embodiments are described below, in order to explain the present invention, by referring to the figures.

Figure 2:
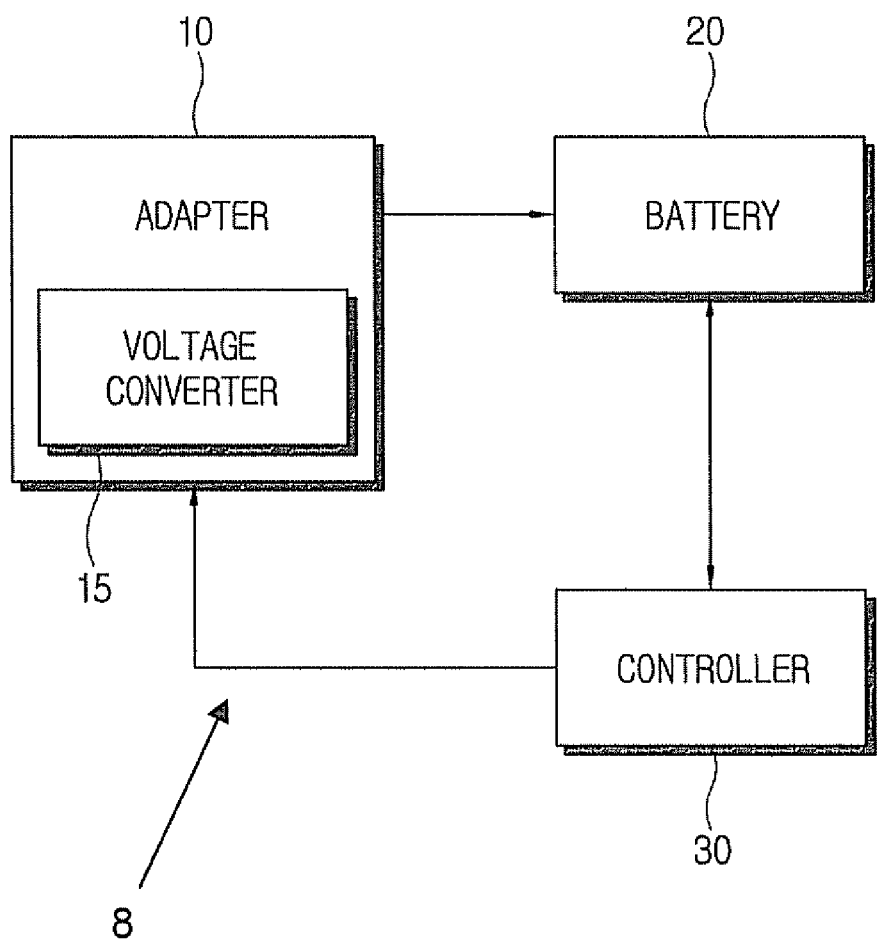
FIG. 2 is a block diagram showing a battery charging apparatus, according to an exemplary embodiment of the present invention.

FIG. 2 is a block diagram showing a battery charging apparatus 8, according to an exemplary embodiment of the present invention. As illustrated in FIG. 2, the battery charging apparatus includes an adapter 10, and a controller 30.

The adapter 10 converts an input alternating-current (AC) power to a direct-current (DC) power used by a battery 20. In particular, the adapter 10 includes a voltage converter 15 to convert the direct-current (DC) power to a charging voltage suitable to charge the battery 20. The controller 30 controls the operation of the voltage converter 15 and controls the supply of the converted DC power (charging voltage) to the battery 20.

Figure 3A:
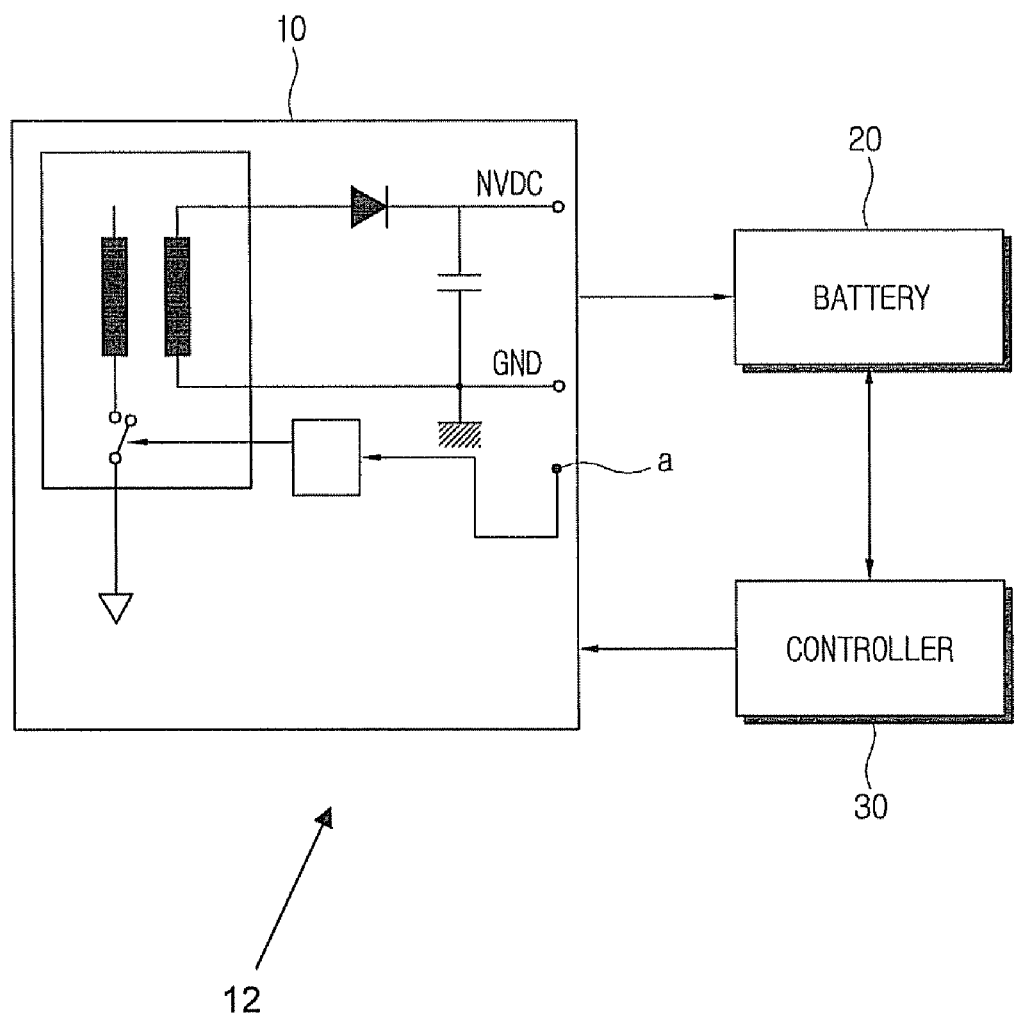
FIG. 3A is a detailed block diagram illustrating an adapter of a battery charging apparatus, according to an exemplary embodiment of the present invention.

As illustrated in FIG. 3A, a battery charging apparatus 12, according to an exemplary embodiment of the present invention, includes the adapter 10. The adapter 10 can be a Narrow VDC $2^{nd}$ (NVDC 2) adapter 10. The adapter 10 includes a control pin "a" to receive a control signal from the controller 30. The voltage converter 15 converts the voltage of the DC power to a charging voltage having a voltage level necessary to charge the battery 20, based on the control signal input through the control pin "a".

As referred to herein, Narrow VDC (NVDC) technology is an EBL (Extended Battery Life) technology that is directed to extending battery life in portable electronic apparatuses. The adapter 10 can reduce a voltage range of an input DC power (VDC), to obtain an optimal efficiency, when a voltage of the DC power is converted to a charging voltage suitable to charge the battery 20 and then provided to the battery 20.

The battery 20 is a secondary battery, which can be recharged using the charging voltage provided from the adapter 10. The battery 20 may be formed of at least one battery cell having a specific charging voltage and output voltage.

The battery 20 supplies data, about the battery 20. Examples of the data include, a full charge bit (FCB) of the battery 20, a full charge capacity (FCC) of the battery 20, and a total capacity decrease amount (MAX ERROR/RELATIVE STATE OF CHANGE (RSOC)) of the battery 20. The battery 20 can determine the total capacity decrease amount (MAX ERROR/RSOC) by recording a number of charge/discharge cycles of the battery 20.

The controller 30 is connected to and receives the data from the battery 20. The controller 30 controls the adapter 10 to supply a charging voltage suitable to charge the battery 20. The controller 30 can be, for example, a central processing unit (CPU) or a microprocessor. The controller 30 communicates with the battery 20, and thereby receives the data from the battery 20. From the data, the controller 30 determines whether the battery 20 needs to be charged, and/or whether a current voltage level of the battery 20 indicates that the battery 20 is fully charged.

The controller 30 supplies a control signal to the adapter 10, to cause the adapter 10 to convert a voltage level of an input power to a charging voltage having a voltage of a level suitable to charge the battery 20. The adapter 10 is controlled by the controller 30 to provide the charging voltage to the battery 20. Here, the controller 30 is connected to a control pin "a" of the adapter 10, and sends the control signal through the control pin "a" to the adapter 10. The adapter 10 converts an input AC power to a DC power, and converts the DC power to a charging voltage suitable to charge the battery 20. The adapter 10 is controlled by the controller 30. If the controller 30 determines that a battery charging process is unnecessary, because the battery 20 is in a fully charged state, the controller 30 sends a control signal, to stop the charging of the battery 20, through the control pin "a" of the adapter 10, to the adapter 10.

The controller 30, according to this exemplary embodiment, can be included in a cable or a connector (neither shown), which connects the adapter 10 with the battery 20. That is, the controller 30 is provided inside a cable that is connected to the battery 20 and the adapter 10. The cable is connected to a control pin "a" of the adapter 10, and provides a control signal thereto, from the controller 30, according to a charged state of the battery 30, determined by the controller 30, through a communication with the battery 20.

Figure 3B:
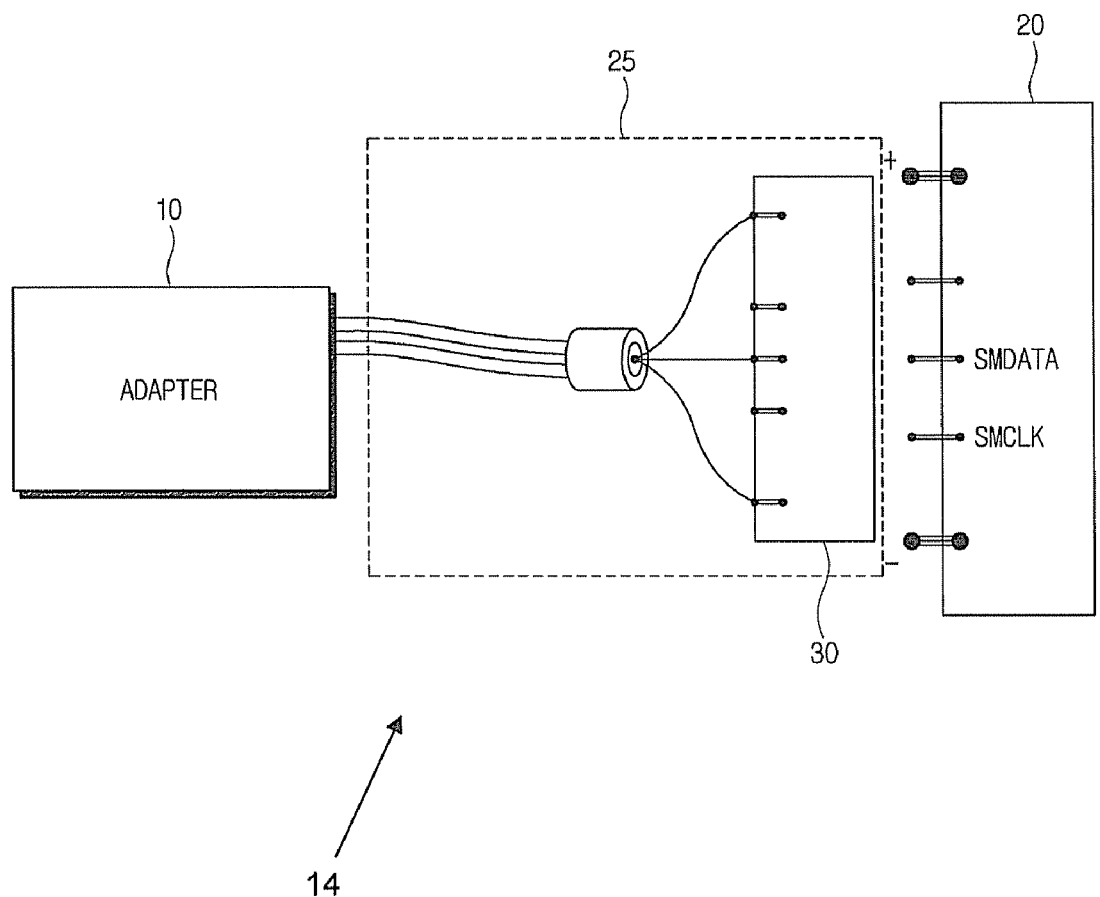
FIG. 3B is a block diagram illustrating a controller of a battery charging apparatus having a cable, according to an exemplary embodiment of the present invention.

For example, as illustrated in FIG. 3B, a battery charging apparatus 14 includes a connector 25 housing the controller 30. The connector 25 can be a cable. The connector 25 is at one end of the cable and connects the battery 20, the controller 30, and the adapter 10. The controller 30 may be included in the connector 25. The controller 30 can be a control integrated circuit (IC), but can be any interface which communicates with the battery 20. As shown, the controller 30 has positive and negative power connections, and data pathways allowing transmittal of SM data and SMCLK data between the battery 20 and the controller 30.

Accordingly, the battery charging apparatus 14 can charge a battery 20 using only the adapter 10, without using an external battery charger. The battery 20 can charged without being removed from a portable electronic apparatus. However, it is understood that the controller 30 could be incorporated into the battery 20, into a docking device for the portable device, etc. The battery charging apparatus 14 can charge the battery 20, without a user having to place the battery in an external battery charger, to thereby enhance the user's convenience, to reduce production costs, and to raise purchase intentions.

Figure 4:
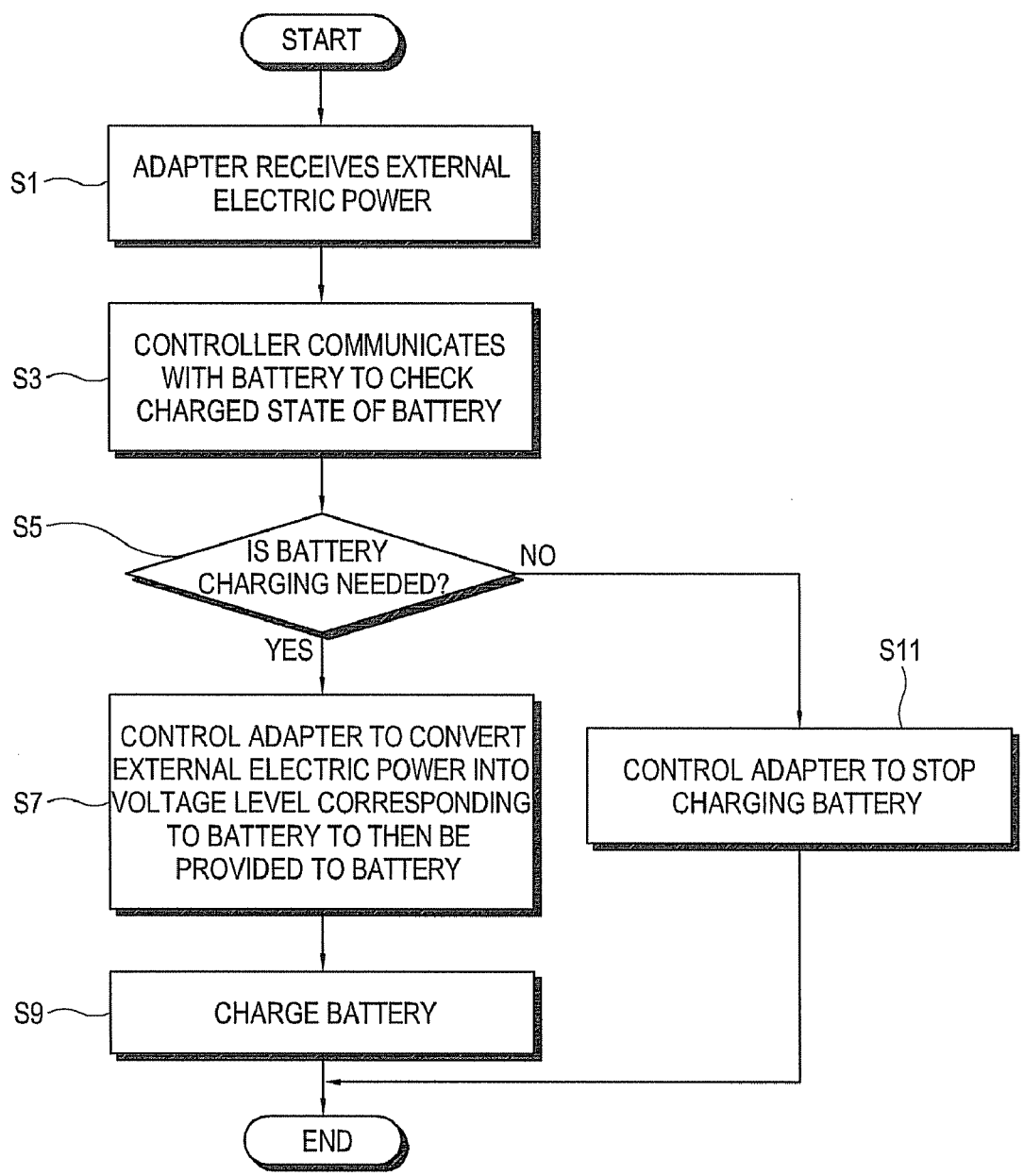
FIG. 4 is a flowchart view illustrating a control process of the battery charging apparatus, according to an exemplary embodiment of the present invention.

A control method of controlling a battery charging apparatus, according to an exemplary embodiment of the present invention, will be described with reference to FIG. 4, which is a flowchart illustrating a control process of the battery charging apparatus. As illustrated in FIG. 4, the adapter 10 receives an external electric power, in an operation S1.

The controller 30 communicates with the battery 20 and determines a charged state of the battery 20, in an operation S3. The determination can be based on data received from the battery 20. The data the controller 30 receives data from the battery 20 can be, for example, a full charge bit (FCB) of the battery 20, a full charge capacity (FCC) of the battery 20, and a total capacity decrease amount (MAX ERROR/ROSC). The controller 30 can determine the MAX ERROR/RSOC, by recording a number of charge/discharge cycles of the battery 20, through communications with the battery 20.

The controller 30 determines whether the battery 20 needs to be charged, in an operation S5, according to the data received in operation S3. If the controller 30 determines the battery 20 needs to be charged, the controller 30 controls the adapter 10 to convert an input power, to a charging voltage suitable to charge the battery 20 and then provides the charging voltage to the battery 20, in an operation S7. As described above, the controller 30 can send a control signal to the adaptor 10 through a control pin "a", which is provided in the adapter 10. The battery 20 is charged by the voltage provided from the adapter 10, in an operation S9.

If the controller 30 determines that the battery 20 need not be charged, since the battery 20 has been fully charged, according to the determination of operation S5, the controller 30 provides a control signal to the adapter 10, to stop the charging the battery 20, in an operation S11.

Accordingly, the battery charging apparatus, according to the exemplary embodiment of the present invention, can charge a battery 20 using only an adapter 10, without using an external battery charger, i.e. without removing the battery 20 from a portable electronic apparatus powered by the battery 20. The battery charging apparatus, according to the exemplary embodiments of the present invention, can charge a battery without moving the battery to an external battery charger, to thereby enhance the convenience of users, to reduce production cost, and to raise purchase intention. However, embodiments might include an external charger.

While not required in all aspects, it is understood that aspects of the invention can be implemented as software and/or firmware encoded on computer readable, to be implemented by one or more computers and/or processors.

As described above, a battery charging apparatus, a control method thereof, and a battery charging control apparatus, can charge a battery using only an adapter, without using a separate external battery charger. The battery is charged while being disposed in a portable electronic apparatus.

Although a few embodiments of the present invention have been shown and described, it would be appreciated by those skilled in the art that changes may be made in this embodiment, without departing from the principles and spirit of the invention, the scope of which is defined in the claims and their equivalents.

What is claimed is:

1. A battery charging apparatus for use in charging a battery, the apparatus comprising:
    an adapter to convert an input electric power to a charging voltage to charge the battery, according to a charged state of the battery; and
    a controller which communicates with the battery to detect the charged state of the battery, and to control the adapter to charge the battery to the charging voltage, based on the detected charged state.

2. The battery charging apparatus according to claim 1, wherein:
    the adapter comprises a voltage converter to convert the input electric power to the charging voltage; and
    the controller controls the voltage converter to convert the input electric power to the charging voltage to charge the battery, based on the determined charged state of the battery.

3. The battery charging apparatus according to claim 2, wherein the adapter is a Narrow VDC $2^{nd}$ (NVDC 2) adapter.

4. The battery charging apparatus according to claim 3, wherein the adapter comprises a control pin to connect the adapter to the controller, and the controller controls the voltage converter via the control pin.

5. The battery charging apparatus according to claim 1, further comprising a cable to connect the battery and the adapter, wherein the controller is disposed in the cable.

6. The battery charging apparatus according to claim 1, further comprising a connector to connect the battery and the adapter, wherein the controller is disposed in the connector.

7. A method of controlling a battery charging apparatus which charges a battery, the method comprising:
    communicating with the battery to determine a charged state of the battery; and
    controlling an adapter to convert an input electric power to a charging voltage suitable to charge the battery, based on the determined charged state of the battery.

8. A battery charging control apparatus comprising:
    a connector to connect to a battery; and
    a controller to communicate with the battery through the connector, to determine a charged state of the battery, to control an external voltage converter to convert an input electric power to a charging voltage suitable to charge the battery according to the determined charged state, and to control the output of the charging voltage to the battery.

9. The battery charging control apparatus according to claim 8, wherein the connector is a cable which connects the battery and the voltage converter.

10. The battery charging control apparatus according to claim 9, wherein the cable houses the controller.

11. The battery charging method of claim 7, wherein the determining of the charged state further comprises the battery determining a full charge capacity (FCC) and a total capacity decrease amount (MAX ERROR/RSOC) thereof, using data communicated from the battery.

12. A battery charging apparatus for use with a battery, comprising:
    a voltage converter to convert a AC power into a DC power, to convert a voltage of the DC power to a charging voltage suitable to charge a battery, according to a detected charged state of the battery, and to output the charging voltage to the battery;
    a connector to connect the voltage converter to the battery; and
    a controller disposed in the connector, to determine the charged state of the battery according to data received from the battery, and to control the voltage converter, such that the charging voltage corresponds to the determined charged state of the battery.

13. The battery charging apparatus of claim 12, wherein the controller determines the charged state according to a full charge capacity (FCC) of the battery, and a total capacity decrease amount indication (MAX ERROR/RSOC) of the battery using the received data.

14. The battery charging apparatus of claim 12, wherein the controller is a central processing unit (CPU) or a microprocessor.

15. A method of controlling a battery charging apparatus which charges a battery, the method comprising:
    receiving data generated by the battery relating to a charged state thereof; and
    controlling an adapter to convert an input electric power to a charging voltage suitable to charge the battery, based on the data from the battery.

16. The method of claim 15, further comprising connecting to the battery using a connector comprising a controller.

17. The method of claim 16, wherein the receiving of the data further comprises using the controller to receive the data.

18. The method of claim 16, wherein the generating of the charging voltage further comprises using the controller to control the adapter to generate the charging voltage.

* * * * *